(No Model.)
J. KELLY.
WATER CLOSET FLUSHING APPARATUS.
No. 415,869. Patented Nov. 26, 1889.
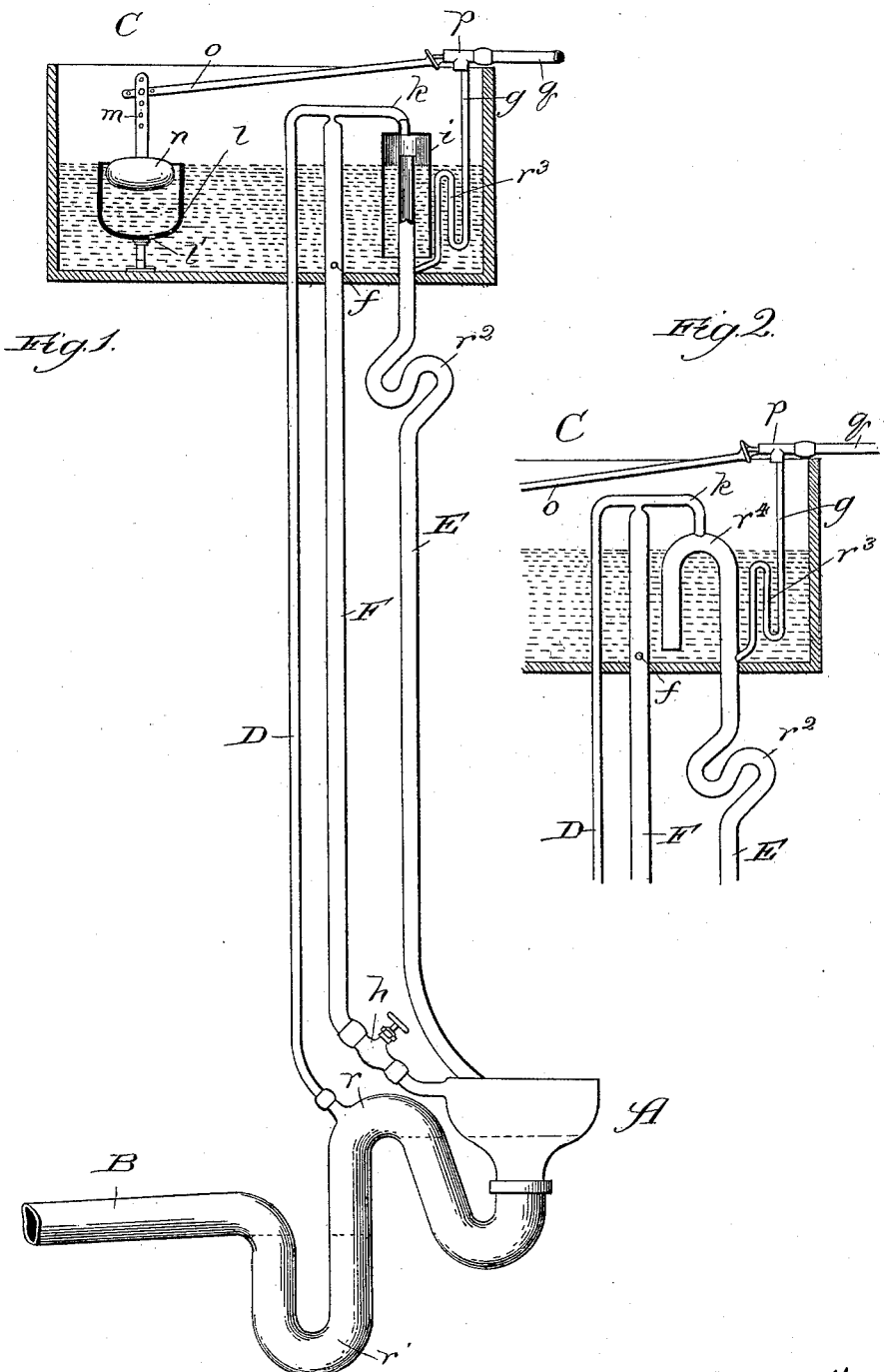
Witnesses:
Chas. E. Gaylord,
J. H. Dyrenforth
Inventor:
John Kelly
By Dyrenforth & Dyrenforth
Attys

UNITED STATES PATENT OFFICE.

JOHN KELLY, OF CHICAGO, ILLINOIS, ASSIGNOR OF ONE-HALF TO JAMES KELLY, OF SAME PLACE.

WATER-CLOSET FLUSHING APPARATUS.

SPECIFICATION forming part of Letters Patent No. 415,869, dated November 26, 1889.

Application filed August 22, 1889. Serial No. 321,591. (No model.)

*To all whom it may concern:*

Be it known that I, JOHN KELLY, a citizen of the United States, residing at Chicago, in the county of Cook and State of Illinois, have invented a new and useful Improvement in Water-Closet Flushing Apparatus, of which the following is a specification.

My invention relates to an improvement in the class of apparatus for flushing a water-closet in which an overhead tank is provided to contain the water for flushing supplied to it, and which tank communicates with the bowl through a suitable conduit, through which the passage of water is controlled by means of a valve, and it relates more particularly to the form of apparatus applied to a bowl from which the outlet-passage is "trapped," and involving an air-pipe extending from the trap into the tank and a pipe leading from the end of the air-pipe in the tank to the bowl.

The objects of my improvement are to avoid the use of any valve in the tank for controlling the discharge of the water for the flushing operation, thereby also to enable the ordinary chain or analogous handle from which to actuate such valve to be dispensed with, and thus also the noise occasioned by the manipulation of the chain and valve mechanism to be obviated, and, further, to provide a generally improved construction of the apparatus.

Referring to the accompanying drawings, Figure 1 shows my improved apparatus in elevation, partly sectional and broken; and Fig. 2 is a similar view showing a modified construction.

A is the bowl, with which is connected in the usual manner the outlet-pipe B, provided with two traps $r$ and $r'$, though my improvement is also applicable where but one trap is provided.

C is the overhead tank, to which leads the water-supply pipe $q$, in the mouth portion $p$ of which is a valve, (not shown,) of ordinary or any suitable construction, for shutting off and letting on the supply, and which is automatically operated by a lever $o$, connected at one end with the valve and at its opposite end with a float $n$ through the medium of a bar $m$, which should be provided with a series of perforations, as shown, to permit setting of the lever $o$ to various angles, according to the degree of movement desired of the lever to control the valve. A cup $l$, having a small perforation $l'$ in its base, is supported in the tank in position to receive the float $n$.

From the trap $r$ an air-pipe D extends into the tank, wherein it is bent to an angle to form a branch $k$, the extremity of which is bent downward and enlarged into a mouth $i$, which extends below the normal water-line in the tank.

E is a pipe extending at one end into the mouth $i$ above the water-line in the tank, (thus forming a species of trap,) and thence to the flushing-channel in the bowl A, being provided with a trap $r^2$.

Between the mouth $i$ and vertical portion of the pipe D a branch F, which should be of somewhat greater diameter than the pipe D, extends from the branch $k$ downward through and beyond the tank to any desired point, and preferably into the bowl A, adjacent to which it contains a valve $h$, involving any suitable construction for controlling the passage through the pipe F, but which I prefer shall be (though not so indicated) of the well-known kind actuated by a spring to close gradually, but to permit of its being opened suddenly. Within and near the base of the tank the pipe F contains a small opening $f$.

A feed-pipe $g$ is provided, for a purpose hereinafter explained, to lead from the mouth $p$ of the supply-pipe $q$ in advance of the valve therein into the pipe E and contains a trap $r^3$.

The operation is as follows: The bowl A and traps $r$ and $r'$ normally contain water up to the water-lines indicated, water being also normally in the tank C and pipe F and lower portion of the trap $r^2$ in pipe E. When it is desired to occasion the flushing, the valve $h$ is opened. This causes the water contained in the pipe F (to which it is supplied through the aperture $f$) to discharge, and in discharging to draw the air contained in the pipes D and E above the water-line in the mouth $i$ through the branch $k$ into the pipe F, thereby creating a partial vacuum in the mouth $i$, which causes the water in the tank to be sucked up to the entrance to the pipe E, and thence discharge through the latter into the bowl, the suction of air through the pipe D also creating a partial vacuum between the traps $r$ and $r'$ and causing the contents of the traps to discharge into the outlet-pipe B. After the contents of the tank have thus been discharged, (the quantity of water in the tank being ordinarily just about sufficient for one flushing operation and the slowly-closing valve $h$ referred to being timed to complete its closure about with the depletion of the tank,) or when sufficient flushing has been produced, the valve $h$ is closed, leaving the bowl and the traps $r$ and $r'$ empty or nearly empty, though these are immediately replenished from the supply through the pipes $g$ and E. The arrangement is of course such as to cause the valve controlled by the lever $o$ to be closed when the cup $l$ is more or less full of water and to open as the float lowers into the cup with the discharge of its contents through the aperture $l'$. This discharge is obviously slower than that of the contents of the tank, and also obviously the cup fills slower than the tank, the aperture $l'$ being preferably of a size to permit the discharge of its contents gradually to open the valve in the supply-pipe $q$ and the refilling through it of the cup gradually to shut off the supply and complete the shutting off with the rise of the water in the tank about to the top of the cup. In this manner the supplying of the tank may be infallibly controlled to the quantity of water desired for flushing.

The mouth $i$ and end of the pipe E extending therein afford practically a trap such as the trap $r^4$, (illustrated in Fig. 2,) which is formed by bending the pipe E at its end which extends into the tank beyond the water-line below the latter and connecting the branch $k$ with it, as shown. This or any analogous construction of trap is effective for my purpose and dispenses with the enlargement or mouth $i$ at the end of the branch $k$.

For some closets the air-pipe D may be dispensed with, (the branch $k$ being then, of course, closed at the end to which that pipe is shown to lead,) when only one trap in the outlet-pipe is required.

What I claim as new, and desire to secure by Letters Patent, is—

1. In a water-closet flushing apparatus, the combination, with the bowl A, outlet-pipe B, provided with traps $r$ and $r'$, and tank C, of an air-pipe D, leading from the trap $r$ into the tank and extended into a branch $k$, terminating in a trap in the tank, a pipe E, having a trap $r^2$ and leading from the trap in the tank into the bowl, and a pipe F, having an aperture $f$ and leading from the branch $k$ downward beyond the tank and provided with a valve $h$, substantially as and for the purpose set forth.

2. In a water-closet flushing apparatus, the combination, with the bowl A, outlet-pipe B, provided with traps $r$ and $r'$, and tank C, of an air-pipe D, leading from the trap $r$ into the tank and extended into a branch $k$, terminating in a trap in the tank, a pipe E, containing a trap $r^2$ and leading from the trap in the tank into the bowl, a pipe F, having an aperture $f$ and leading from the branch $k$ downward beyond the tank and provided with a valve $h$, and a feed-pipe $g$, leading from the water-supply into the pipe E below the water-line in the tank, substantially as and for the purpose set forth.

3. In a water-closet flushing apparatus, the combination, with the bowl A, outlet-pipe B, provided with traps $r$ and $r'$, and tank C, of an air-pipe D, leading from the trap $r$ into the tank and extended into a branch $k$, terminating in a mouth $i$, projecting downward in the tank from above the water-line below the latter, a pipe E, having a trap $r^2$ and extending with one end into the mouth $i$ above the water-line, and leading at its opposite end into the bowl, a pipe F, having an aperture $f$ and leading from the branch $k$ downward beyond the tank and provided with a valve $h$ and a supply-pipe $q$, containing a valve opened by the emptying of the tank and closed by the filling thereof, substantially as and for the purpose set forth.

4. In a water-closet flushing apparatus, the combination, with the bowl A, trapped outlet-pipe B, and tank C, of a pipe F, leading from the bowl into the tank and provided therein with an aperture $f$, a valve $h$ in the pipe F, a branch $k$, communicating with the pipe F in the tank and terminating in the latter in a trap, and a pipe E, having a trap $r^2$ and leading from the trap in the tank into the bowl, substantially as described.

5. In combination, a bowl A, outlet-pipe B, having traps $r$ and $r'$, a tank C, a supply-pipe $q$, containing a valve connected with one end of a lever $o$, a cup $l$, supported in the tank and having an aperture $l'$, a float $n$ in the cup and connected with the opposite end of the lever, an air-pipe D, leading from the trap $r$ into the tank and extended into a branch $k$, terminating in a mouth $i$, projecting downward in the tank from above the water-line below the latter, a pipe E, containing a trap $r^2$ and extending with one end into the mouth $i$ above the water-line and leading at its opposite end into the bowl, a pipe F, having an aperture $f$ and leading from the branch $k$ downward beyond the tank and provided with a valve $h$, and a pipe $g$, provided with a trap $r^3$ and affording communication between the supply-pipe and the pipe E, the whole being constructed and arranged to operate substantially as described.

JOHN KELLY.

In presence of—
J. W. DYRENFORTH,
M. J. FROST.